United States Patent [19]

Kunz et al.

[11] Patent Number: 4,596,751
[45] Date of Patent: Jun. 24, 1986

[54] MOLTEN CARBONATE FUEL CELL WITH IMPROVED ELECTROLYTE STORAGE

[75] Inventors: Harold R. Kunz, Vernon; Stephen J. Szymanski, Manchester, both of Conn.

[73] Assignee: United Technologies Corporation, Hartford, Conn.

[21] Appl. No.: 680,404

[22] Filed: Dec. 10, 1984

[51] Int. Cl.$^4$ ............................................. H01M 8/14
[52] U.S. Cl. ...................................... 429/41; 429/44; 429/16
[58] Field of Search ..................... 429/16, 41, 44, 46, 429/103, 12, 112

[56] References Cited

U.S. PATENT DOCUMENTS

| | | | |
|---|---|---|---|
| 3,503,808 | 3/1970 | Agruss et al. | 429/16 |
| 3,878,296 | 4/1975 | Vine et al. | 423/600 |
| 4,035,551 | 7/1977 | Grevstad | 429/44 |
| 4,038,463 | 7/1977 | Lamarine et al. | 429/44 |
| 4,185,145 | 1/1980 | Breault | 429/34 |
| 4,239,557 | 12/1980 | Thellmann | 252/512 X |
| 4,247,604 | 1/1981 | Marianowski et al. | 429/40 |
| 4,317,865 | 3/1982 | Trocciola et al. | 429/41 |
| 4,411,968 | 10/1983 | Reiser et al. | 429/41 |
| 4,507,262 | 3/1985 | Karas et al. | 429/41 X |
| 4,511,636 | 4/1985 | Vogel et al. | 429/41 |

Primary Examiner—Anthony Skapars
Attorney, Agent, or Firm—A. Dean Olson

[57] ABSTRACT

Molten carbonate fuel cells having anodes, cathodes, and matrices of specific characteristics result in improved cell performance as electrolyte is lost due to evaporation, reaction, etc. The anode has a mean pore diameter less than that of the cathode, a porosity sufficient to contain enough electrolyte to provide for the electrolyte lost, and a ratio of maximum pore diameter at 90% electrolyte fill to maximum pore diameter at 10% electrolyte fill of less than about three. The cathode has a larger mean pore size than that of the anode, a thickness greater than about 0.050 cm, a porosity greater than about 78%, and pore-size distribution such that, when the anode electrolyte content changes from 90% to 10% fill, the cathode electrolyte content changes from about 40% to about 25% fill. In addition, the cathode has about 20% of its pore volumes in pores less than about $0.5\mu$ resulting in a surface area of the cathode above about 1 $m^2/g$. The matrix has a pore size distribution such that greater than 98% of the matrix is filled with electrolyte when the anode is 10% filled with electrolyte.

10 Claims, 4 Drawing Figures

MOLTEN CARBONATE FUEL CELL WITH IMPROVED ELECTROLYTE STORAGE

DESCRIPTION

1. Technical Field

The field of art to which this invention pertains is molten carbonate fuel cells and more particularly to molten carbonate fuel cell with improved anodes, cathodes and matrices.

2. Background Art

Fuel cells which use alkali-metal carbonates as the electrolyte are well known in the art and are generally referred to as molten carbonate fuel cells since the electrolyte is liquid at typical operating temperatures in the range of 550° C.–750° C. The electrolyte is usually mixed with an inert particulate or fibrous material which remains solid during cell operations, maintains the space between the cathode and anode portions of the cell, and prevents the mixing of the two reactants. The electrolyte is in direct contact with the electrodes where the three phase reactions (gas-electrolyte-electrode) take place. Hydrogen is consumed in the anode area producing water, carbon dioxide, and electrons. The electrons flow to the cathode through an external circuit producing the desired current flow. At the anode there must be ready entry for the reactant gas, ready exit for the chemical reaction products and ready exit for the product electrons.

Molten carbonate cells, like other fuel cell types rely on liquid capillary forces of electrolyte contained in the "matrix" to seal and isolate reactant gases. Thus it is essential that the matrix should be filled with electrolyte, at least as much electrolyte as is necessary to fill the matrix is introduced into the fuel cell prior to its being put into operation for the first time. However, during fuel cell operation electrolyte is gradually lost through evaporation, creepage, reaction, and removal in product gas streams. Thus to preserve the seal function and to maintain ionic continuity within the cell, electrolyte should be stored in molten carbonate fuel cells in excess of that needed for initial cell operation.

Electrochemical cells which can accommodate changes in electrolyte volume have been disclosed. Note commonly assigned U.S. Pat. Nos. 4,035,551, 4,062,322 and 4,038,463. For instance, U.S. Pat. No. 4,035,551 discloses an electrolyte reservoir for a fuel cell, including molten carbonate cells, comprising an electrode substrate with a pore distribution that in conjunction with the electrolyte matrix provides a source of electrolyte from the electrode to the matrix. These inventions significantly increase the cell's ability to respond to changes in the volume of electrolyte thus increasing the cell's performance.

However, in order to reach the 40,000 hours life necessary for commercial success, there is a continual search in the art for stable molten carbonate cells having longer life at high levels of performance.

DISCLOSURE OF INVENTION

This invention is directed to a long life metal carbonate fuel cell containing an anode electrode having specific physical characteristics and a cathode electrode in contact with and separated by an electrolyte matrix. The anode's characteristics including a mean pore diameter less than that of the cathode, a ratio of maximum pore diameter at 90% electrolyte fill to maximum pore diameter at 10% electrolyte fill of less than about 3 and a porosity sufficient to provide enough electrolyte for that which is lost during normal operation of the cell.

Another aspect of this invention is a stable metal carbonate fuel cell where the cathode has specific physical characteristics. These characteristics include a larger mean pore size than the anode, a pore size distribution such that when the anode electrolyte content changes from 90% to 10% fill the cathode electrolyte content changes from about 40% to about 25% fill, a pore size distribution such that 20% of its pore volume is in pores less than about 0.5 micron ($\mu$) in diameter resulting in a surface area above about 1 square meter/gram ($1 m^2/g$), and a thickness greater than about 0.05 centimeter (cm) and a porosity above about 78%.

Yet another aspect of this invention is a long life metal carbonate fuel cell where the matrix has specific physical characteristics including a pore size distribution such that greater than 98% of the matrix is filled with electrolyte when the anode is 10% filled with electrolyte.

These components either independently or in combination provide improved stable molten carbonate cells having longer life at high levels of performance. Greater fuel cell stability and performance are attained without adding or subtracting materials, parts, or components. These results are achieved by designing components based on their respective sensitivity to electrolyte loss so that for instance, the matrix, being most sensitive to electrolyte loss, retains the highest electrolyte level as electrolyte is lost. The parameters affected include mean pore size, pore size distribution and porosity. This invention is a significant advancement towards reaching a stable long-life fuel cell that is necessary for commercial success.

The foregoing and other objects, features and advantages of the present invention will become more apparent from the following description of preferred embodiments and accompanying drawings.

BEST MODE FOR CARRYING OUT THE INVENTION

Figure 1:
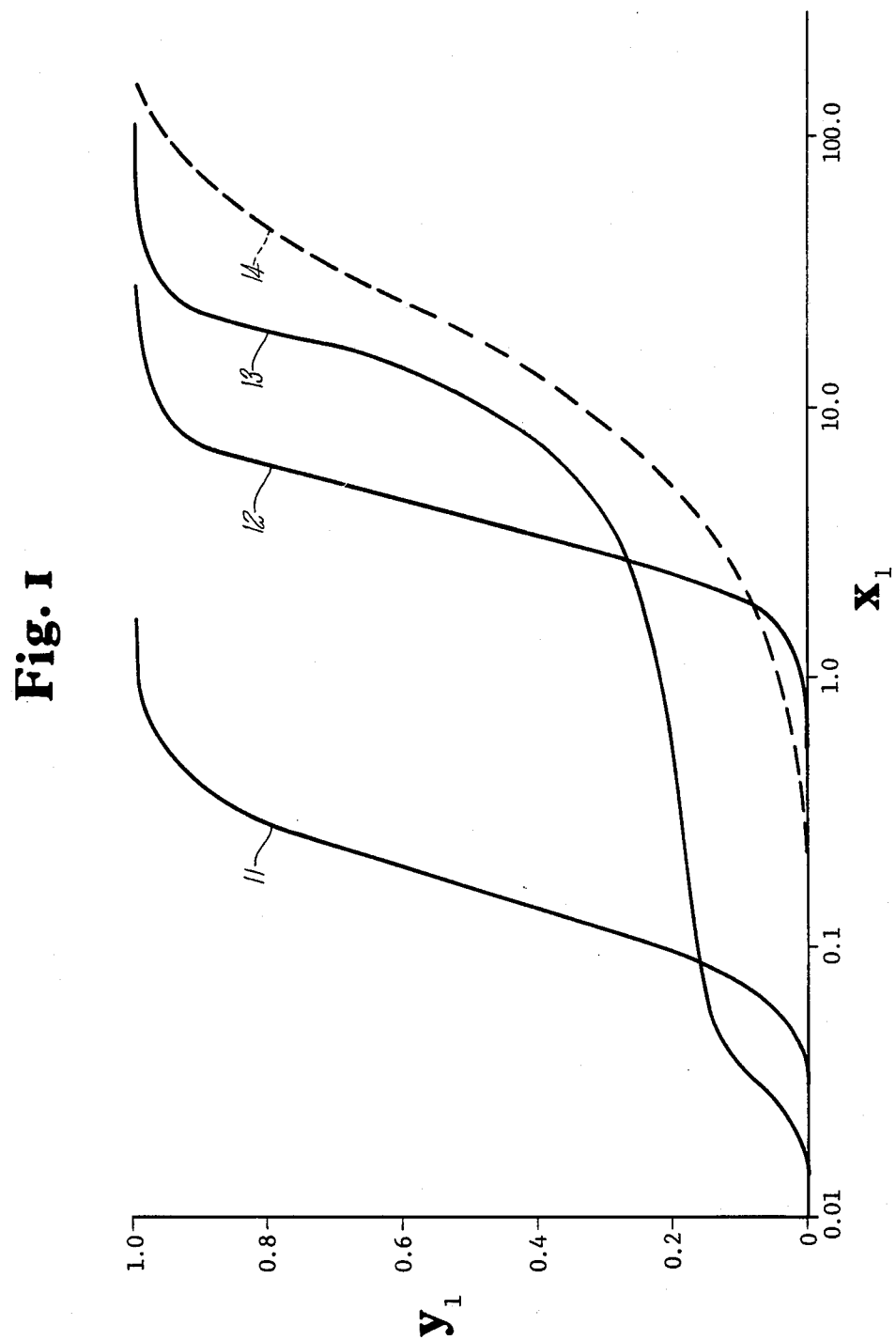
FIG. 1 plots normalized volume as a function of the pore diameter for fuel cell components.

The cell components (anode, cathode, and matrix) can be made from any material known in the art to be suitable for molten carbonate fuel cell components, as the improved performance and stability of this discovery are based not on the materials but the form of the components. However, the base metal particles are preferably nickel, cobalt, and mixtures thereof. Electrodes could also include conductive dispersoid particles or stabilizing agent particles which preferably contain aluminum, chromium or zirconium.

The particle size and particle size distribution are selected to impart the cell components with certain characteristics pertaining to % porosity, mean pore size, pore size distribution, etc. These characteristics (described below) provide the cell components with the form that results in improved performance and stability. The correlation between particle size and the enumerated characteristics can be readily understood by those skilled in the art.

The anode has a shape conventional to the art, however its form is such that it has several characteristics detailed below. For instance it has a mean pore diameter less than the cathode's, about $10\mu$, and preferably less than about $4\mu$. The anode should have a porosity sufficient to contain enough electrolyte to provide for the electrolyte lost through evaporation, creepage and reaction. This is typically about 45% to about 65% porosity and preferably about 55% porosity. Percent porosity is defined as the pore volume divided by the total component volume (including the pore volume). The anode should also have a ratio of maximum pore diameter at 90% electrolyte fill to maximum pore diameter at 10% electrolyte fill less than about three. Maximum pore diameter refers to the largest pore size that contains electrolyte at a certain level of electrolyte fill. The term % fill refers to the component void volume filled with electrolyte as a percentage of the total component void volume. Preferably, 90% of the pore volumes have a pore diameter less than about $7\mu$ and 10% of the pore volumes have a pore diamter less than about $2.5\mu$. In addition best results are achieved when the initial electrolyte volume in the anode is larger than that of the cathode and matrix.

The cathode has a shape conventional to the art; however, again its form is such that it has several characteristics described below. It should have a mean pore diameter larger than that of the anode's and preferbly a mean pore diameter above about $10\mu$. The cathode should be above about 0.05 cm in thickness and preferably about 0.07 cm to about 0.10 cm in thickness. Also the cathode's pore size distribution is such that, when the anode electrolyte fill changes from 90% to 10% fill, the cathode electrolyte content should change from about 40% to about 25% fill. Preferably, 60% of the pore volumes have a pore diameter less than about $14\mu$ and 30% of the pore volumes have a pore diameter less than about $4\mu$. The cathode should also have a porosity above about 78%. This is equivalent to about 60% after experiencing cell environment (the cell in operational mode). Generally, cathode porosities change when placed in typical cell operating conditions, i.e., hot oxidizing gases (649° C.). In addition, the cathode should have about 20% of its pore volume in pores less than about $0.5\mu$ in diameter resulting in a surface area above about $1m^2/g$.

The matrix has a shape conventional to the art but should have a pore size distribution such that greater than 98% of the matrix is filled with electrolyte when the anode is 10% filled with electrolyte. Preferably, 98% of the pore volumes have a pore diameter less than about $0.8\mu$. It is also preferred that the matrix has a mean pore diameter of about $0.15\mu$.

Although each of the above-described components independently will result in improved cell performance, even greater cell performance can be achieved by combining these components to make improved cells. Thus a preferred embodiment of this invention is a fuel cell with an anode and a matrix both having the characteristics described above. Another preferred embodiment of this invention is a fuel cell with a cathode and a matrix both having the characteristics described above. Still another preferred embodiment of this invention is a fuel cell with an anode and a cathode both having the characteristics described above. An especially preferred embodiment of this invention is a fuel cell with an anode, cathode and matrix that have the characteristics described above.

Fuel cell components of this type may be made by techniques conventional in this art. The stabilizing agent powder and metal powder should be uniformly mixed, the relative concentration and sizes of the metal and dispersoid powders must naturally be such as to produce, upon further processing, the desired microstructural characteristics in the finished body. However, the porosity and pore size distribution in the finished component is influenced not only by the concentrations and sizes of metal and dispersoid particles and sintering conditions but also by the degree of compaction experienced in forming the compact. The compact may be formed by any of the various well-known techniques, including uni- or multidirectional die pressing, isostatic pressing, powder rolling, extruding, and roll bar molding.

The sintering of the formed powdered metal articles is preferably accomplished in a sintering furnace having an inert or reducing atmosphere, usually hydrogen. The sintering temperature depends on the type of metal particles utilized for both the base metal and the dispersoid particles. Generally sintering is carried out at a temperature which is approximately 95% of the melting point of the base metal. The sintered article is then preferably compacted by any conventional means to form an article having the desired degree of porosity. The article can then be subjected to an annealing treatment if required. The exact temperature and duration of annealing depends on the materials used to form the porous metal article.

EXAMPLE

A cathode was made using the following process. Nickel powder, available from Inco Co. as #255 was sifted through a #100 mesh screen having a sieve opening of $149\mu$ available from Tyler Co. A mold mask was filled with the sifted nickel powder. The mold powder was compacted by rolling to impart the desired porosity i.e. the more rolling the less porosity. The mold mask was then transferred onto a belt running through a furnace for sintering at a temperature greater than 650° C. for 30–45 minutes and temperatures in the range of 954°–1027° C. for 8–12 minutes. The sintering atmosphere was 20% hydrogen and 80% nitrogen and a minimum oven belt speed of 3 inches/minute was maintained. The sintering conditions also affect the electrodes final characteristics. The resultant structure was removed from the furnace, cooled and rolled to a thickness of $0.100 \pm 0.005$ cm. Subsequent to experiencing cell conditions, i.e. hot oxidizing gases ($O_2$, $CO_2$, $H_2O$ at 649° C.) in which the nickel cathode is transformed into nickel oxide, the cathode had the approximate characteristics of cathode A in Table I; thickness 0.075 cm, porosity 60%, mean pore diameter $10.5\mu$, 37% initial fill and 25% final fill. Anode and matrix material according to the present invention can be similarly made, with appropriate adjustment of the above process including the starting materials, the degree of compaction and the sintering conditions.

The components of this disclosure are used in molten carbonate fuel cells. Generally, the operating temperatures of a molten carbonate fuel cell range from about 550° C. to about 750° C. At the cathode, oxygen and carbon dioxide react to form carbonate via the overall reaction:

$$\tfrac{1}{2} O_2 + CO_2 + 2e^- \rightarrow CO_3^=$$

At the anode, hydrogen in the fuel gas reacts with carbonate ions from the electrolyte to form water and carbon dioxide:

$$H_2 + CO_3^= \rightarrow H_2O + CO_2 + 2e^-$$

It should be noted that while this disclosure is specifically directed to molten carbonate fuel cells, it would be within the purview of one skilled in the art to make components that have specific characteristics relative to electrolyte loss sensitivity for other fuel cell types, i.e. phosphoric acid fuel cells.

These cell components provide improved performance and stability because they have been optimally designed based on their respective sensitivity to electrolyte loss. While not wanting to be held to any theory, it is believed that electrolyte sensitivity is determined by two competing concerns. One factor is that the electrolyte should be minimized so that the diffusion of reactant gas into the electrode does not cause a concentration polarization. However, if there is too little electrolyte, there will be an increased ohmic loss which results from the difficulty of ions to migrate from one electrode to another. Although there is an optimum level of electrolyte volume for each component, a different working range exists in which each component will function. In order of increasing sensitivity to electrolyte loss the components are anode, cathode and matrix. This discovery ensures that electrolyte will be lost from the components in proportion to their respective sensitivity to electrolyte loss. It achieves this by optimal design of, for instance, pore design so that through capillary action electrolyte will be lost from the component with the largest pore size first.

A clearer understanding of this discovery and the component's relative sensitivities to electrolyte loss may be had by reference to the accompanying figures. In FIG. 1 normalized volume ($Y_1$) is plotted as a function of the pore diameter ($X_1$) for a matrix (11), anode (12), cathode A (13) and cathode B (14).

Figure 2:
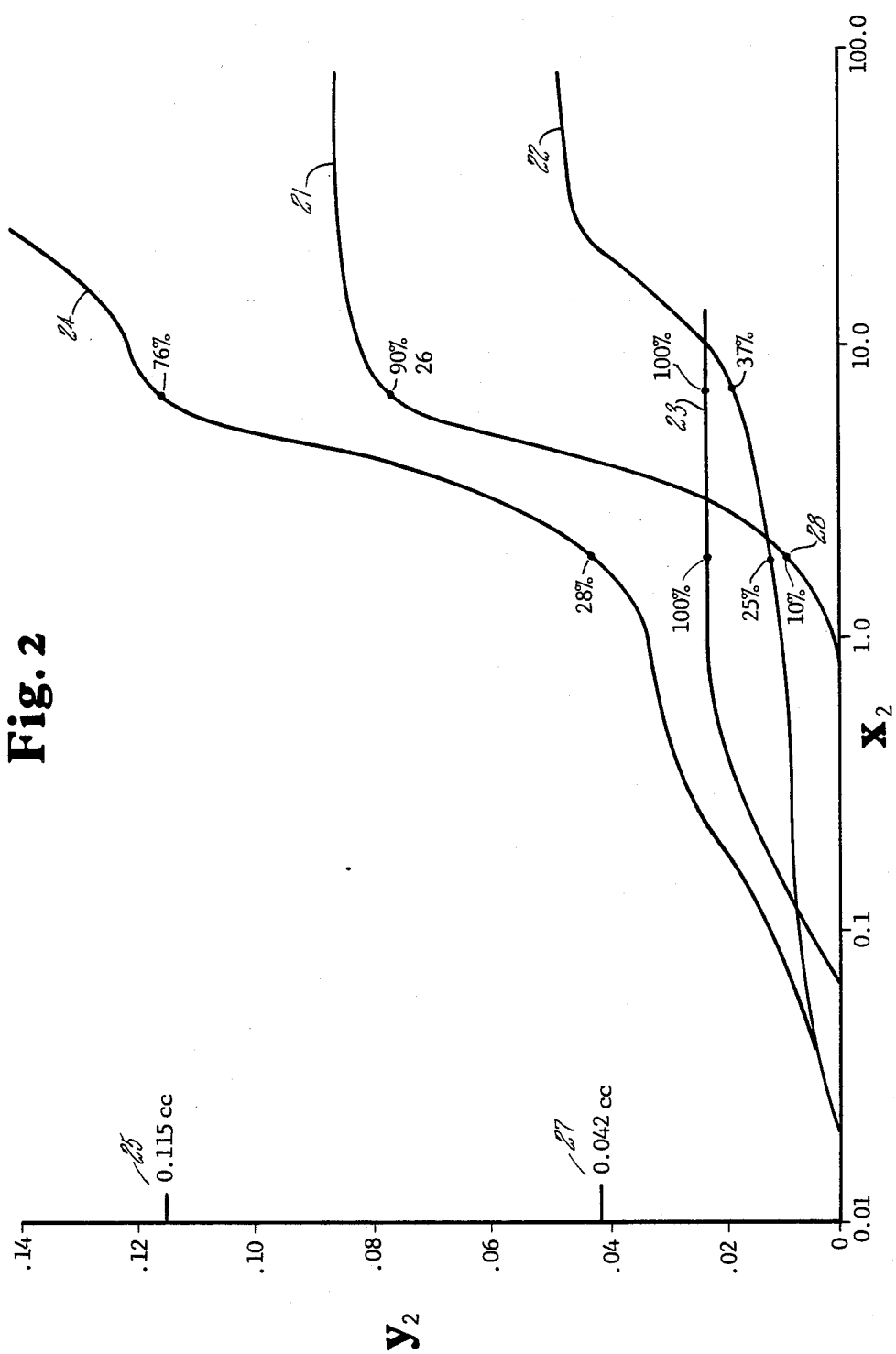
FIG. 2 plots component void volume as a function of pore diameter for fuel cell components having specific characteristics.

In FIG. 2 the component void volume ($Y_2$) in cubic centimeters (cc) is plotted as a function of pore diameter ($X_2$) in microns ($\mu$). The void volume distributions of the anode curve (21), cathode curve (22), and matrix curve (23) when totaled equal the total cell volume distribution curve (24). Such a diagram was obtained by taking the individual pore distributions in FIG. 1 and multiplying the normalized volume by the corresponding void volume of each component (anode, cathode A and matrix). Thus void volume is defined as (Frontal Area, sq. cm) (Thickness, cm) (Porosity, %)/100.

To illustrate the discovery suppose that the cell package initially contains 0.115 cc (25 in FIG. 2) of molten carbonate electrolyte per sq. cm. frontal area for a corresponding anode fill of 90% (26 in FIG. 2). All pores with a diameter less than or equal to 6.8 microns will then be flooded. With time, electrolyte is lost due to evaporation, creepage and chemical reaction. Assume that after a given period of time only 0.042 cc (27 in FIG. 2) of molten carbonate electrolyte per sq. cm. frontal area for a corresponding anode fill of 10% (28 in FIG. 2). The component characteristics and initial and final states of the electrodes and matrix are detailed in Table I.

TABLE I

|  | Anode | Cathode A | Matrix | Cell |
|---|---|---|---|---|
| Initial fill, % | 90 | 37 | 100 | 76 |
| Final fill, % | 10 | 25 | 100 | 28 |
| Mean pore size, $\mu$ | 4.1 | 10.5 | .25 | — |
| Thickness, cm | 0.152 | 0.076 | 0.056 | — |
| Porosity, % | 55 | 60 | 40 | — |

Therefore, of the 0.073 cc lost, 0.067 cc or 92% was from the anode and 0.006 cc or 8% was from the cathode. The matrix remains full. Since the anode is more tolerant to electrolyte volume changes, the anode is used for storage.

Figure 3:
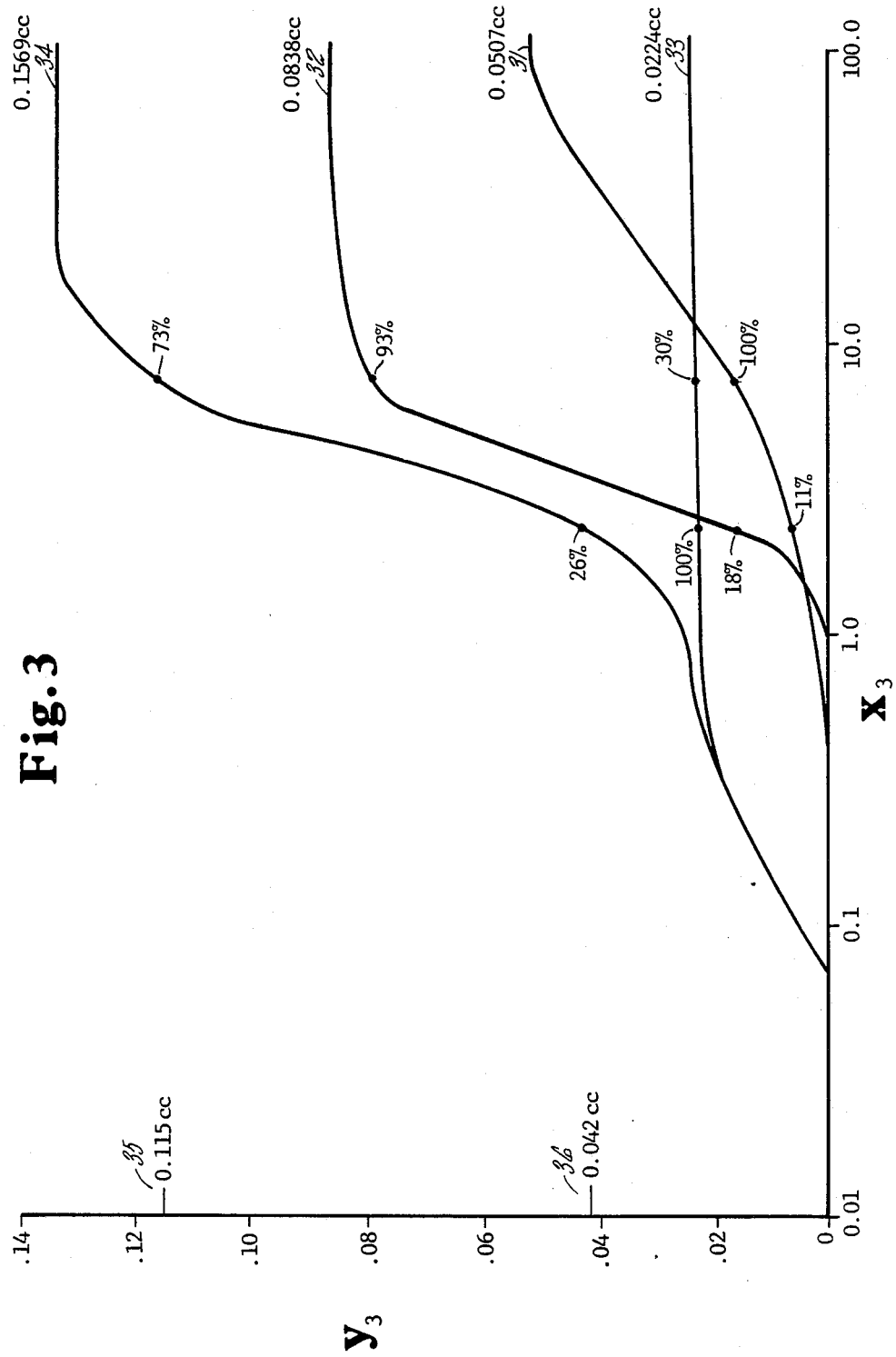
FIG. 3 plots component void volume as a function of pore diameter for fuel cell components, where one component has different specific characteristics than in FIG. 2.

FIG. 3 demonstrates the impact of small changes in component design on electrolyte loss. The figure follows the same concept as FIG. 2, however there were two minor changes made to the cathode, the pore size was increased from 10.5$\mu$ to 16$\mu$ and the thickness was increased from 0.076 to 0.089 cm. Thus component void volume cc ($Y_3$ in FIG. 3) is plotted as a function of pore diameter $\mu$ ($X_3$ in FIG. 3). Again the normalized volume of the individual pore distributions in FIG. 1 were multiplied by the corresponding void volume of each component. However, the changed cathode is represented by curve 14 in FIG. 1, and curve 31 in the void volume distribution diagram FIG. 3. The void volume distributions of the anode (32) and matrix (33) are also represented. Again the volumes of each component for a given pore diameter have been totaled to give the cell volume curve (34). The component characteristics and initial and final fill states of the electrodes and matrix are detailed in Table II.

TABLE II

|  | Anode | Cathode B | Matrix | Cell |
|---|---|---|---|---|
| Initial fill, % | 93 | 30 | 100 | 73 |
| Final fill, % | 18 | 11 | 100 | 26 |
| Mean pore size, $\mu$ | 4.1 | 16 | .25 | — |
| Thickness, cm | 0.152 | 0.089 | 0.056 | — |
| Porosity, % | 55 | 60 | 40 | — |

Using the same initial (35) and final (36) cell electrolyte contents (0.115 cc and 0.042 cc respectively) as in the previous case, 0.073 cc electrolyte was again lost. However this time 0.063 cc or 87% was lost from the anode and 0.010 cc or 13% was lost from the cathode while the matrix remains full. In comparison to the previous case on a relative basis more electrolyte was lost from the cathode and less from the anode. This is the reverse of their respective sensitivities to electrolyte loss.

Figure 4:
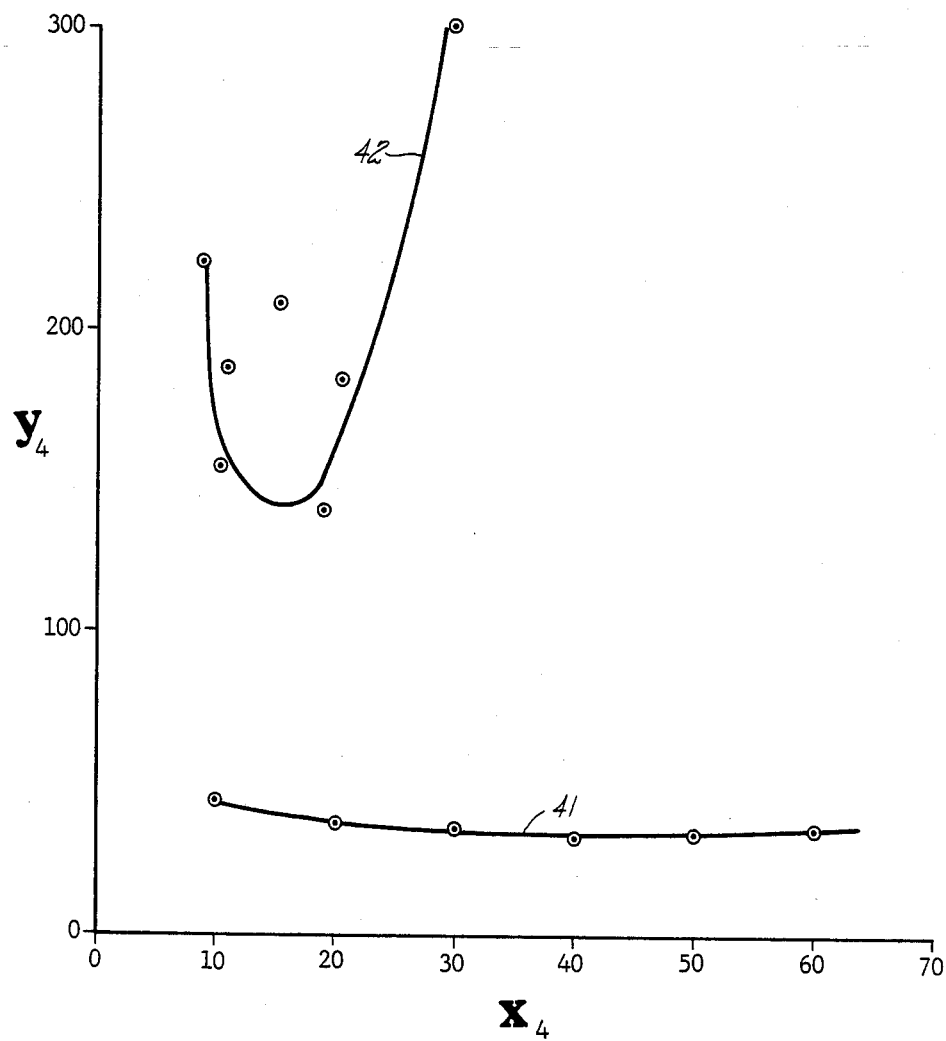
FIG. 4 translates the data of FIG. 2 and FIG. 3 into performance by plotting performance loss as a function of fill.

FIG. 4 illustrates performance for cathodes similar to those described above. Cathode performance loss in millivolts (mv) at 160 milliamps/square centimeter (MA/CM$^2$) ($Y_4$) is plotted as a function of estimated percent cathode fill ($X_4$). Cathode A (41) experienced a performance loss of only 32 to 35 mv as the cell and cathode fill levels varied from 76% to 28% and 37% to 25% respectively. By contrast cathode B (42) experienced a performance loss of 300 to 160 mv as the cell and cathode fill levels varied from 73% to 26% and 30% to 11% respectively. This severe penalty is a result of the characteristics of cathode B, specifically, the loss of volume in pores with diameters less than 0.5 micron and the higher mean pore size.

This discovery provides a significant advancement in fuel cell technology by improving the overall performance of the fuel cell by defining component design parameters. These parameters include pore size, pore-size distribution and porosity. The components maintain cell performance and stability as electrolyte is lost due to reaction, leakage and evaporation during normal cell operations. Thus the anode, cathode, and matrix are designed based on their respective sensitivity to electrolyte loss so that for instance, the matrix, being most sensitive to electrolyte loss retains the highest electrolyte level as electrolyte is lost.

This discovery increases the cell's ability to respond to changes in the volume of electrolyte without adding or subtracting materials, parts or components. It marks another step towards the long-life operation necessary for the commercial success of fuel cells.

Although this invention has been shown and described with respect to a preferred embodiment, it will be understood by those skilled in this art that various changes in form and detail thereof may be made without departing from the spirit and scope of the claimed invention.

We claim:

1. A fuel cell including an electrolyte-matrix containing an alkali metal carbonate electrolyte which is molten during operation of the fuel cell, an anode electrode in contact with the electrolyte-matrix and a cathode electrode spaced apart from the anode electrode and in contact with the electrolyte-matrix wherein the improvement comprises:
   (a) the anode having a mean pore diameter less than that of the cathode;
   (b) the anode having a porosity sufficient to contain enough electrolyte to provide for the electrolyte lost during normal operation of the cell; and
   (c) the anode having a ratio of maximum pore diameter at 90% electrolyte fill to maximum pore diameter at 10% electrolyte fill of less than about three.

2. The improved fuel cell as recited in claim 1 wherein the mean pore diameter is less than about 4 microns.

3. A fuel cell including an electolyte-matrix containing an alkali metal carbonate electrolyte which is molten during operation of the fuel cell, an anode electrode in contact with the electolyte-matrix and a cathode electrode spaced apart from the anode electrode and in contact with the electrolyte-matrix wherein the improvement comprises:
   (a) the cathode having a larger mean pore size than that of the anode;
   (b) the cathode having a thickness greater than about 0.050 centimeter;
   (c) the cathode having a pore size distribution such that, when the anode electrolyte content changes from 90% to 10% fill, the cathode electrolyte content changes from about 40% to about 25% fill;
   (d) the cathode having a porosity greater than about 78%; and
   (e) the cathode having about 20% of its pore volumes in pores less than about 0.5 micron in diameter resulting in a surface area defining the pores above about 1 square meter/gram.

4. The fuel cell as recited in claim 3 wherein the cathode is 0.075 to 0.100 centimeter thick.

5. The fuel cell as recited in claim 3 wherein the cathode has a mean pore size greater than about 10 microns.

6. A fuel cell including an electrolyte-matrix containing an alkali metal carbonate electrolyte which is molten during operation of the fuel cell, an anode electrode in contact with the electrolyte-matrix and a cathode electrode spaced apart from the anode electrode and in contact with the electrolyte-matrix wherein the improvement comprises:
   (a) the matrix having a pore size distribution such that greater than 98% of the matrix is filled with electrolyte when the anode is 10% filled with electrolyte.

7. A fuel cell as recited in claim 6 wherein the mean pore diameter of the matrix is about 0.15 microns.

8. A fuel cell as recited in claim 3 further comprising:
   (a) the anode having a mean pore diameter less than that of the cathode;
   (b) the anode having a porosity sufficient to contain enough electrolyte to provide for the electrolyte lost during normal operation of the cell; and
   (c) the anode having a ratio of maximum pore diameter at 90% electrolyte fill to maximum pore diameter at 10% electrolyte fill of less than about three.

9. A fuel cell of claim 1 or 3 further comprising the matrix having a pore size distribution such that greater than 98% of the matrix is filled with electrolyte when the anode is 10% filled with electrolyte.

10. A fuel cell as recited in claim 7 further comprising the matrix having a pore size distribution such that greater than 98% of the matrix is filled with electrolyte when the anode is 10% filled with electrolyte.

* * * * *

UNITED STATES PATENT AND TRADEMARK OFFICE
CERTIFICATE OF CORRECTION

PATENT NO.    : 4,596,751

DATED         : June 24, 1986

INVENTOR(S)   : Harold R. Kunz and Stephen J. Szymanski

It is certified that error appears in the above-identified patent and that said Letters Patent is hereby corrected as shown below:

Column 5, line 5, "$\frac{1}{2} O_2 + CO_2 + 2e^{31} \rightarrow CO_3^{=}$" should read --$\frac{1}{2} O_2 + CO_2 + 2e^- \rightarrow CO_3^{=}$--

Signed and Sealed this

Thirteenth Day of January, 1987

Attest:

DONALD J. QUIGG

Attesting Officer

Commissioner of Patents and Trademarks